United States Patent
Yanase

[11] Patent Number: 5,811,891
[45] Date of Patent: Sep. 22, 1998

[54] SWITCHING UNIT PROVIDED WITH A SWITCH DISCRIMINATING FUNCTION

[75] Inventor: Takeshi Yanase, Kosai, Japan

[73] Assignee: Yazaki Corporation, Tokyo, Japan

[21] Appl. No.: 392,182

[22] Filed: Feb. 22, 1995

[30]  Foreign Application Priority Data

Mar. 23, 1994 [JP] Japan ................................. 6-051789

[51] Int. Cl.$^6$ ................. H01H 1/04; B60L 1/00
[52] U.S. Cl. ................. 307/112; 307/10.1; 307/38; 439/34
[58] Field of Search ................ 307/112, 38, 39, 307/42, 113, 10.1, 9.1, 10.4, 10.5; 364/424.084, 424.027, 424.095; 439/34; 701/1, 29, 32, 36, 49; 70/DIG. 46

[56]  References Cited

U.S. PATENT DOCUMENTS

| | | | |
|---|---|---|---|
| 4,737,656 | 4/1988 | Gottlieb | 307/10.1 |
| 4,785,194 | 11/1988 | Gottlieb | 307/10.1 |
| 4,992,671 | 2/1991 | Gille et al. | 307/10.1 |
| 5,040,990 | 8/1991 | Suman et al. | 439/34 |
| 5,192,873 | 3/1993 | Wrenbeck et al. | 307/38 |
| 5,424,586 | 6/1995 | Hattori et al. | 307/10.1 |
| 5,475,592 | 12/1995 | Wnuk et al. | 364/424.05 |

*Primary Examiner*—William M. Shoop, Jr.
*Assistant Examiner*—Jonathan S. Kaplan
*Attorney, Agent, or Firm*—Armstrong, Westerman, Hattori, McLeland & Naughton

[57]  ABSTRACT

A switching unit includes a plurality of operation switches and terminal loads corresponding to each of the operation switches. A switch is connected to a load by way of a controlling circuit unit. Each of the operation switches includes a recognition signal generator for generating individually different switch signals when each switch is turned on. The controlling circuit unit includes a switch discriminator that generates an output signal for activating a predetermined terminal load on receiving each of the switch signals from the recognition signal generating means. By replacing an operation switch with another which contains a different recognition signal generator, the unit can cope with a change of the grade of a vehicle, change of required function and so on, making possible a reduction in the number of terms to be used, making it possible to reduce the total production cost.

9 Claims, 6 Drawing Sheets

SWITCHING UNIT PROVIDED WITH A SWITCH DISCRIMINATING FUNCTION

BACKGROUND OF THE INVENTION

1. Field of the Invention

The present invention relates to a switching unit having a switch discriminating function for activating electric terminal loads in vehicles.

2. Description of the Prior Art

Conventionally, as shown in FIG. 5, there are a plurality of switches 3 installed around a measuring meter (meter plate) 2 at an instrument panel 1 in a vehicle, and there are occasions that a different switch has to be mounted at the same location P in accordance with a change of the grade of a vehicle, a change of a required function and so on. For example, if a switch of the grade "A" is to be installed here, a fog-lamp switch 4a is installed as shown in FIG. 6, whereas a rear-window defogger switch 4b is installed if a switch of the grade "B" is to be mounted here as shown in FIG. 7. As a matter of fact, a wiring distribution (wire-harness) 5a connected to switch 4a has to be changed to a different wiring distribution 5b to be connected to switch 4b, which results in an increase in the number of terms to be used in accordance with the change of the wiring distribution from 5a to 5b, and thus impeding a standardization of the wiring distribution.

In order to avoid the above problem, there has been provided as shown in FIG. 8 a multi-transmission system mounted at a switch installing location P. With this construction in the above conventional system, however, even when a switch signal from switch 4 is inputted to a multi-controlling unit 8, it is difficult to judge whether the signal received by another multi-controlling unit 6 is a control signal to a relay Ry1 to turn a fog lamp 7a on or off, or the one to a relay Ry2 to activate a rear-window defogger 7b, and thus either the multi-control unit 6 or 8 has to be adjusted on the program in accordance with the grade of a vehicle, required function and so on.

SUMMARY OF THE INVENTION

The present invention has been made to solve the above-mentioned problems, and accordingly, it is an object of the present invention to provide a switching unit having a switch signal discriminating function, which is capable of reducing the number of terms to be used in a wiring distribution, a controlling unit or the like in accordance with a change of the grade of a vehicle, required function and so on.

In order to accomplish the above objective, the present invention provides a switching unit in which a plurality of operation switches and terminal loads corresponding to each of the switches are connected by way of a controlling circuit unit, wherein each of the operation switches comprises a recognition signal generating means for generating individually different switch signals when each of the operation switches is turned on, and the controlling circuit unit further comprises a switch discriminating means that generates an output signal for activating a predetermined terminal load on receiving each of the switch signals from the recognition signal generating means.

With the construction above, a different predetermined terminal load can be easily activated only by replacing one operation switch with another, since a switch discriminating circuit preliminarily provided in the controlling circuit unit reads out the signal fed from the signal recognition means of the newly replaced switch. Accordingly, if a switch discriminating circuit in the controlling circuit unit is formed to have such a capacity to cope with the maximum number of switches required in the grade of a vehicle, the terms to be used in a controlling unit, wiring distribution or the like can be deduced, whereby a standardization thereof is made possible.

Other features and advantages of the invention will be apparent from the following description taken in connection with the accompanying drawing.

DETAILED DESCRIPTION OF THE PREFERRED EMBODIMENTS

In FIGS. 1A to 1C, 4a' denotes a switch for a fog lamp, 4b' denotes a rear-window defogger and 4c'denotes a rear-wiper switch, and each of these switches contains two output terminals 9a and 9b.

Switches 4a' to 4c' form respectively different wiring distributions such that different switch signals are out-putted when their respective switch contacts are switched on, wherein these switch signals are denoted as recognition signals representative of different functional purposes of each switch, in other words, for activating respective terminal loads. For example, it is predetermined that a switch represented by 4a', one output terminal 9a of which is connected to the positive side, while the other output terminal 9b is connected to the ground side GND, is for activating a fog lamp, a switch represented by 4c', whose output terminal 9b is open, is for activating a rear wiper, and a switch 4b', whose wiring distribution is a reverse of switch 4c', is for activating a rear-window defogger.

Further, in FIGS. 1A to 1C, 8' represents a controlling circuit unit, each having input terminals (9a, 9b) corresponding to output terminals 9a, 9b of each of the above switches 4a' to 4c', which controlling circuit unit being further provided with a switch discriminating circuit 10'corresponding, respectively, to switches 4a' to 4c'.

Figure 2:
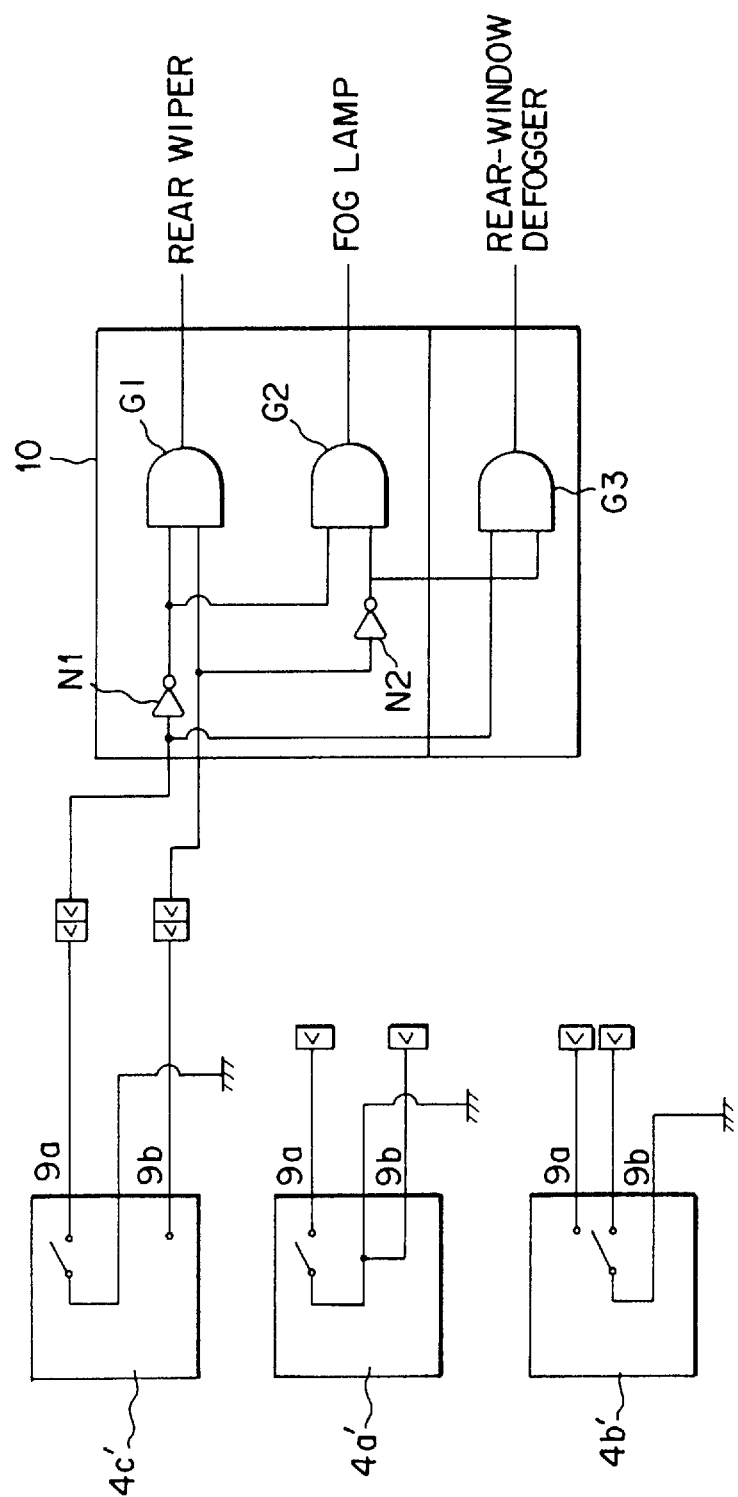
FIG. 2 is an explanatory view, representing a switch discriminating circuit corresponding to each of the switches shown in Figs.1A to 1C.

FIG. 2 represents one example of the switch discriminating circuit 10, which is composed of three AND gates G1, G2 and G3, and two inverters N1 and N2.

With the above construction, when a fog lamp switch 4a' is powered on, switching signals "0", "0" are outputted respectively from output terminals 9a and 9b, whereby the two input sides of the AND gate G2 become "1" by means of the inverters N1 and N2, and thus the output thereof becomes "1" to finally put the fog lamp on. If the fog-lamp switch 4a' is set to off, output signals "1", "0" are outputted respectively from output terminals 9a and 9b, whereby the input at the inverter N1 side of AND gate G2 becomes "0", then the output therefrom also becomes "0", so that the fog lamp is turned off.

In the same way, when a rear-window defogger switch 4b' is powered on, output switching signals "1", "0" outputted respectively from output terminals 9a and 9b are inputted to a switch discriminating circuit 10, whereby two input sides of AND gate G3 becomes "1", and thus the output thereof becomes "1" to finally activate the rear-window defogger. Further, when a rear-wiper switch 4c' is set to on, output signals "0", "1" outputted from output terminals 9a and 9b are inputted to a switch discriminating circuit 10, whereby the output from AND gate G1 becomes "1" to finally activate the rear wiper.

As explained above, the controlling circuit unit 8' comprises a switch discriminating circuit 10 for discriminating the switch signals outputted from a recognition signal generating means of each switch 4a', 4b' and 4c' for outputting signals to activate allotted functions corresponding to each switch signal. Thus, it is not required to change an entire circuit construction of the controlling circuit unit 8' in order to cope with a change of the grade of a vehicle, change of a required function and so on, and all that is needed is to replace only such switches as 4a', 4b' or 4c' in so-called a cassette changing manner.

Figure 8:
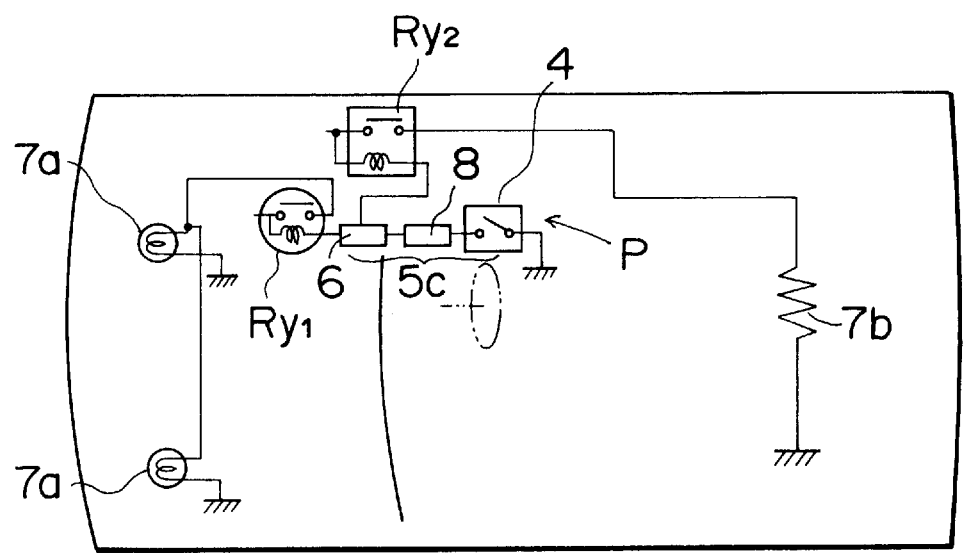
FIG. 8 is a conventional wiring distribution in which a multi-transmission system for the structures shown in FIGS. 6 and 7 is represented.

It is to be noted that the output signals from each of AND gates G1 to G3 is multi-processed by time sharing operation together with other signals from switches other than the above switches 4a' to 4c', from sensors and so on, and are transmitted as shown in FIG. 8 to a multi-controlling unit 6 as serial signals. The multi-controlling unit 6 converts the serial signals to parallel signals, and controls Ry1, Ry2 (switching elements) by these outputted parallel signals to activate the corresponding terminal loads 7a, 7b.

Figure 1A:
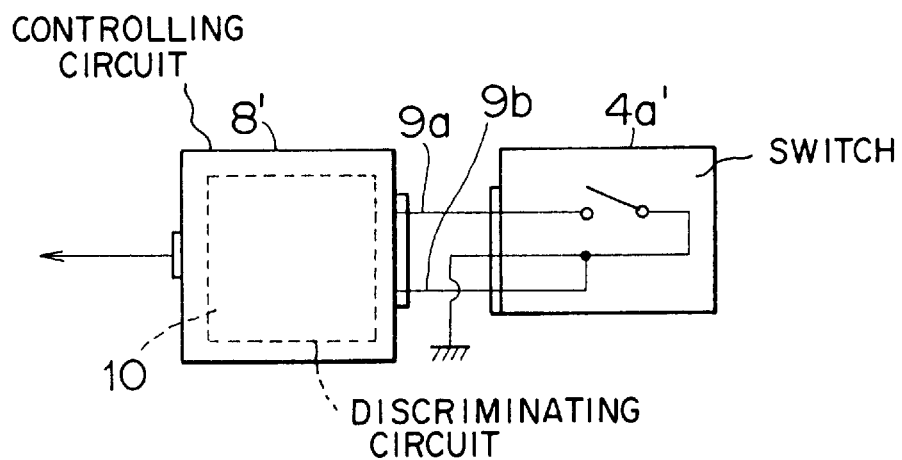
FIGS. 1A, 1B and 1C are block diagrams each illustrating a switching unit of the present invention in which a switch and a controlling circuit unit are connected to each other.
Figure 1B:
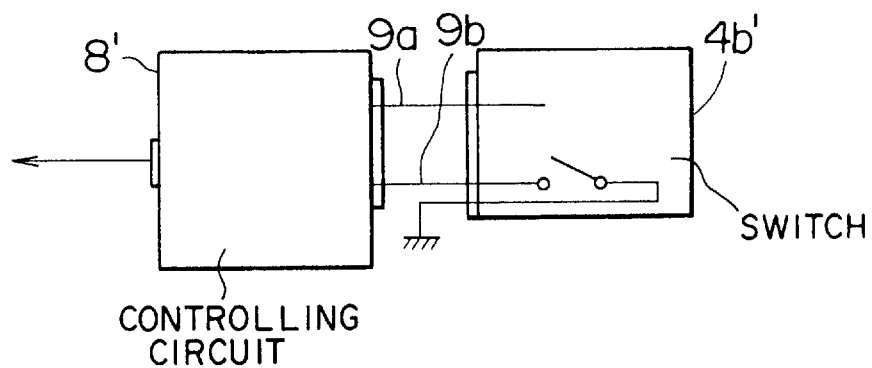
Figure 1C:
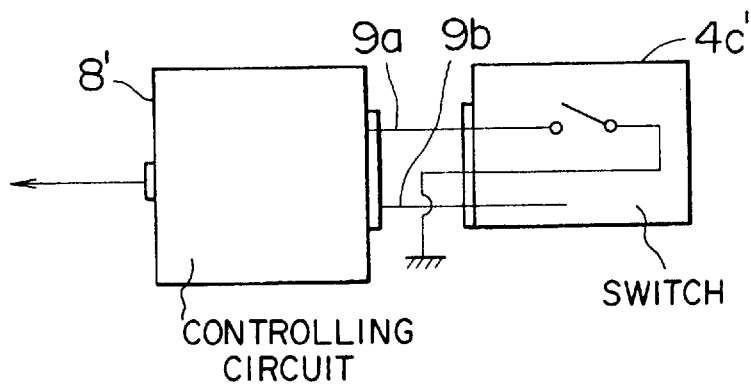

FIGS. 1A to 1C respectively show an example in which a switch signal representative of a recognition signal of itself is made in combination of two output signals from output terminals 9a and 9b. However, it is not limited to this, and in fact, it can be made in combination of, for example, even three output signals.

Figure 3A:
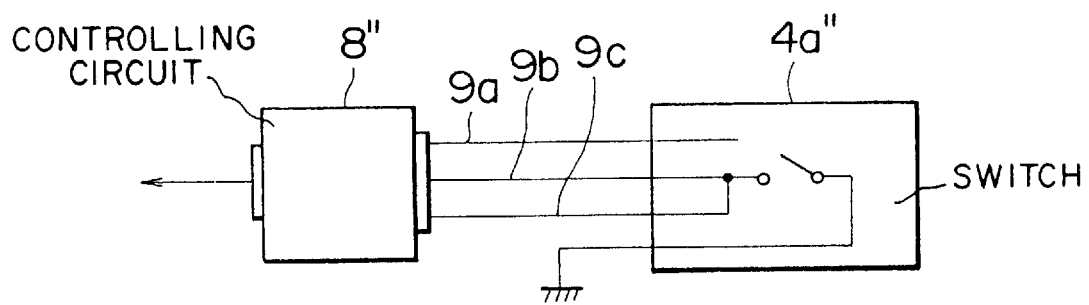
FIGS. 3A and 3B are block diagrams respectively illustrating other embodiments of the present invention.
Figure 3B:
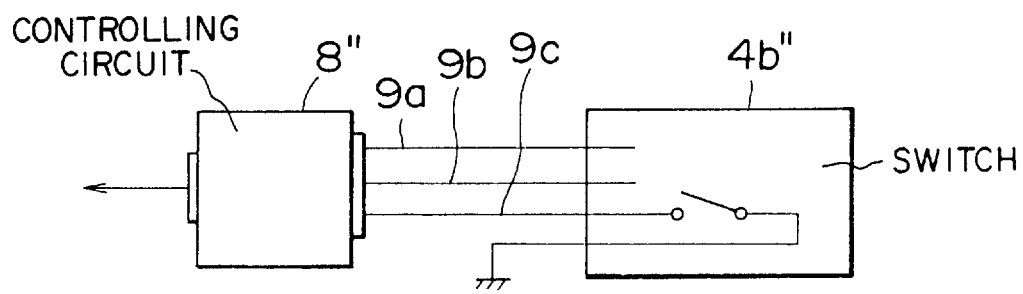

In FIGS. 3A and 3B, 4a" denotes a fog-lamp switch, and 4b" represents a rear-window defogger switch, wherein each switch 4a", 4b" comprises three output terminals 9a, 9b and 9c. Reference numeral 8" denotes a controlling circuit unit thereof.

Regarding switch 4a", an output terminal 9a is open, and terminal 9c is connected to the positive contact side. When the switch contact is set to on, outputs from output terminals 9a, 9b and 9c are respectively "1", "0" and "0", and when off, the outputs are "1", "1" and "1" respectively. Regarding switch 4b", output terminals 9a and 9b are both open, and output terminal 9c is connected to the positive side. These switch signals become, when the switch contact is set to on, respectively "1", "1" and "0", whereas when off, become respectively "1", "1" and "1", which are different from those outputted from switch 4a".

Figure 4:
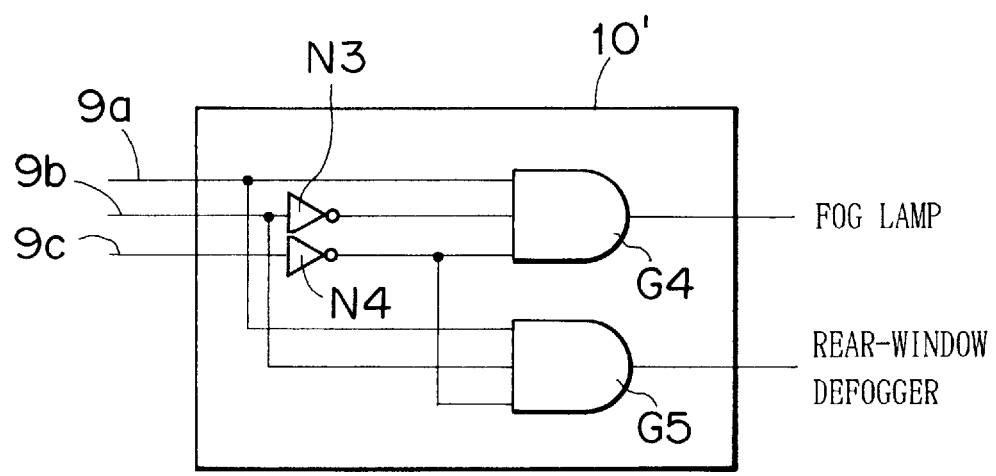
FIG. 4 is an explanatory view, representing a switch discriminating unit corresponding to each of the switches shown in Figs.3A and 3B.
Figure 5:
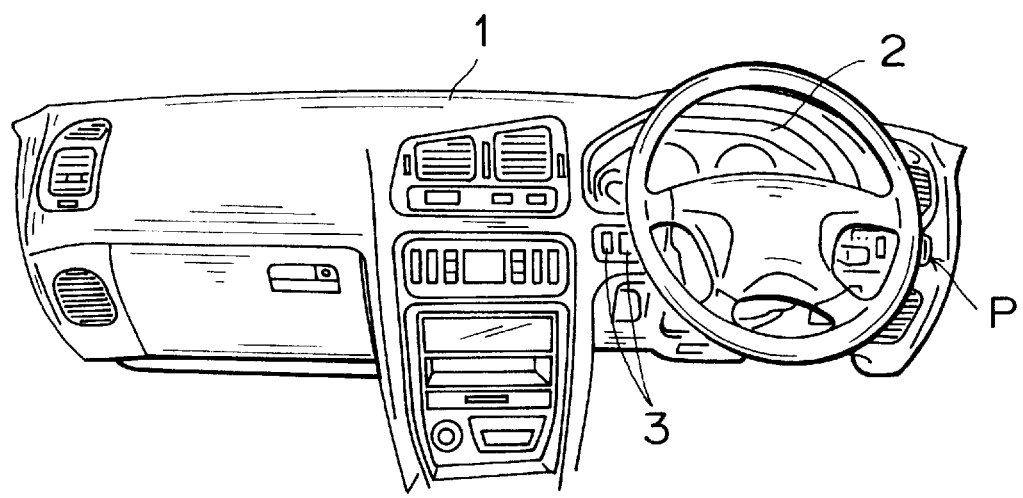
FIG. 5 is an illustration showing various operation switches in the mounted state at an instrument panel of a vehicle.
Figure 6:
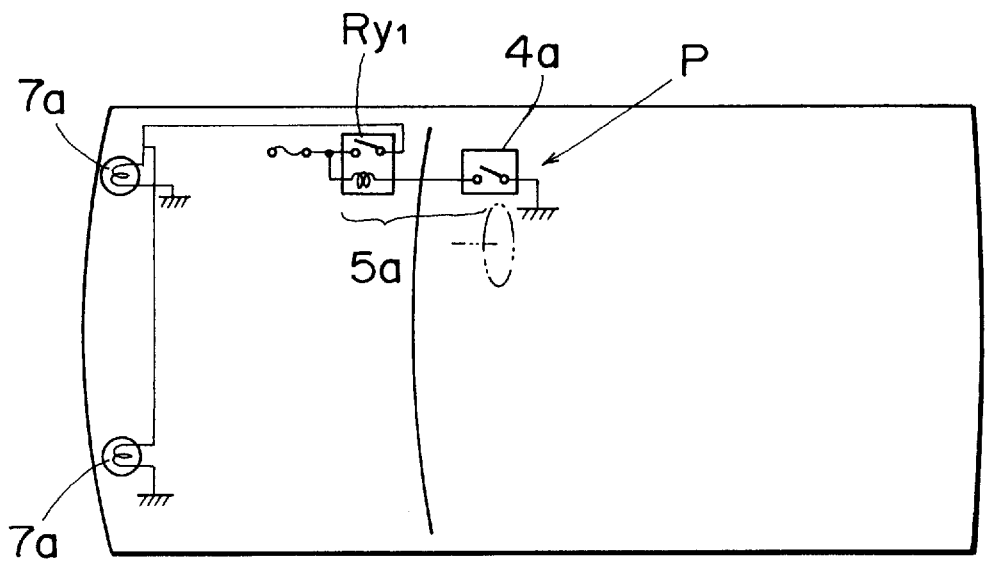
FIG. 6 is a conventional wiring distribution of a fog lamp and a switch for activating it.
Figure 7:
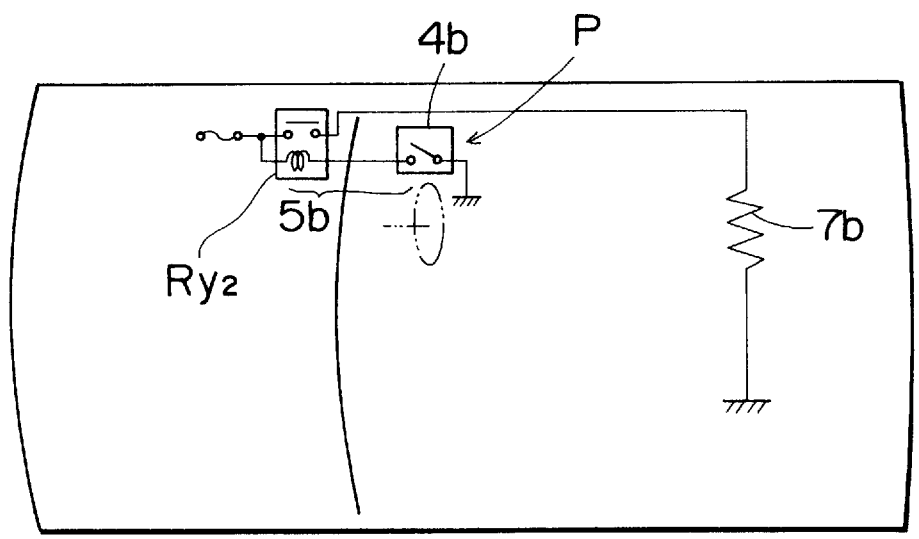
FIG. 7 is a conventional wiring distribution of a rear-window defogger and a switch for activating it.

FIG. 4 represents a switch discriminating circuit 10' associated with the above switches 4a" and 4b", which is composed of two three-input AND gates G4, G5 and two inverters N3 and N4.

In the above embodiment, when switch 4a" is set to on, all the input sides of AND gate G4 are set to "1" because of the inverters N3 and N4, and the output thereof also becomes "1", so that the fog lamp is turned on. In the same way, when switch 4b" is set to on, the output from AND gate G5 becomes "1". So that the rear-window defogger is activated.

[Effect of the Invention]

As explained heretofore, the switching unit according to the present invention is formed such that a plurality of operation switches and terminal loads corresponding to each of the switches are connected by way of a controlling circuit unit, wherein each of the operation switches comprises a recognition signal generating means for generating individually different switch signals when each switch is turned on, and the controlling circuit unit further comprises a switch discriminating means that generates an output signal for activating a predetermined terminal load on receiving each of the switch signals from the recognition signal generating means. With this construction, only by replacing an operation switch with another which contains a recognition signal generating means, the unit can cope with a change of the grade of a vehicle, change of required function and so on, making possible a reduction in the number of terms to be used, whereby a mas-production is also made possible to reduce the total production cost.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A switching unit comprising:

an operation switch including switch recognition means for generating only an off switch signal and an on switch signal said off switch signal generated when said switch is turned off and said on switch signal generated when said switch is turned on; and switch discriminating means, operably connected to a plurality of terminal loads, for generating a plurality of output signals for respectively activating said plurality of terminal loads, said discriminating means being operably connected to said operation switch having logical inputs received only from said operation switch, and generating only one of said plurality of output signal only in response to receiving said on switch signal of the connected operation switch through said switch recognition means, wherein said operation switch is detachably connected to said switch discriminating means, being replaceable and any of other operation switches respectively having different switch recognition means corresponding to respective terminal loads, and the switch signal generated by the connected operation switch being fed to said switch discriminating means for activating only the corresponding terminal load.

2. A switching unit as claimed in claim 1, wherein said recognition means includes a combination of more than two output terminals.

3. A switching system comprising:

a plurality of operation switches, each including recognition signal generating means, each generating individually different switch signals when each switch is turned on, each of said plurality of operation switches only generating an on switch signal and an off switch signal, corresponding to whether each switch is on or off; and switch discriminating means for generating an output signal for activating a predetermined terminal load, operably connected to only one of said plurality of operation switches and generating said output signal on receiving a switch signal from said recognition signal generating means.

4. The switching system of claim 3, wherein said switch discriminating means includes at least two outputs to at least first and second predetermined loads, respectively, and generates a first output signal to said first predetermined load upon recognizing a first switch signal and generates a second output signal to said second predetermined load upon recognizing a second switch signal.

5. The switching system of claim 3, wherein said plurality of operation switches each include at least two terminals for generating said individually different switch signals.

6. A switching circuit comprising:

a replaceable switch including at least two terminals, only generating an off switch signal and an on switch signal, said off switch signal generated at said at least two terminals when said switch is turned off and said on switch signal generated at said at least two terminals when said switch is turned on; and a switch discriminating circuit including logic means, detachably connected to said at least two terminals of said switch to receive said switch signal outputs as an input, and having at least first and second outputs to first and second loads respectively, wherein said logic means of said switch discriminating circuit logically multiplies said switch signal outputs of said at least two terminals of said switch and activates only one of said first and second loads in response to said switch signal outputs being received.

7. The switching circuit of claim 6 wherein said switch includes at least two terminals and said logic means of said switch discriminating circuit includes inverters and AND gates which logically multiply outputs of said at least two terminals.

8. The switching circuit of claim 7, wherein at least one AND gate of said logic means of said switch discriminating circuit logically multiplies outputs of said at least two terminals of said switch after inverting at least one of said outputs with an inverter.

9. The switching circuit of claim 6, wherein said logic means has logical inputs only from said replaceable switch.

* * * * *